(12) United States Patent
Schick et al.

(10) Patent No.: US 10,386,842 B2
(45) Date of Patent: Aug. 20, 2019

(54) UNMANNED AERIAL VEHICLE LIGHT SHOW

(71) Applicant: Intel IP Corporation, Santa Clara, CA (US)

(72) Inventors: Roman Schick, Krailling (DE); Daniel Pohl, Puchheim (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/810,202

(22) Filed: Nov. 13, 2017

(65) Prior Publication Data

US 2019/0146501 A1 May 16, 2019

(51) Int. Cl.
| | |
|---|---|
| *G05D 1/00* | (2006.01) |
| *G06T 7/70* | (2017.01) |
| *B64C 39/00* | (2006.01) |
| *G09F 21/06* | (2006.01) |
| *B64C 39/02* | (2006.01) |

(52) U.S. Cl.
CPC ......... *G05D 1/0094* (2013.01); *B64C 39/024* (2013.01); *G06T 7/70* (2017.01); *G09F 21/06* (2013.01); *B64C 2201/104* (2013.01); *B64C 2201/108* (2013.01); *B64C 2201/12* (2013.01); *B64C 2201/141* (2013.01); *G06T 2207/10032* (2013.01)

(58) Field of Classification Search
CPC .............. G05D 1/0094; G06T 7/70; G06T 2207/10032; B64C 39/024; B64C 2201/104; B64C 2201/108; B64C 2201/12; B64C 2201/141; G09F 21/06

USPC ............................................................ 701/3
See application file for complete search history.

(56) References Cited

U.S. PATENT DOCUMENTS

| | | | | |
|---|---|---|---|---|
| 4,601,761 | A * | 7/1986 | Proctor | B23K 7/00 148/204 |
| 5,022,324 | A * | 6/1991 | Rice, Jr. | F02P 23/04 102/201 |
| 9,102,406 | B2 * | 8/2015 | Stark | B64C 39/024 |
| 2009/0225299 | A1 * | 9/2009 | Crawford | G01C 3/08 356/4.07 |
| 2012/0043411 | A1 * | 2/2012 | Beck | B64C 39/024 244/3.24 |
| 2013/0070239 | A1 * | 3/2013 | Crawford | G01S 17/66 356/139.04 |
| 2016/0129363 | A1 * | 5/2016 | Wong | A63H 37/00 446/475 |
| 2016/0318607 | A1 * | 11/2016 | Desai | B64D 1/16 |
| 2017/0259183 | A1 * | 9/2017 | Matloff | A63H 27/12 |
| 2018/0026718 | A1 * | 1/2018 | Leiba | H04B 10/1129 |
| 2018/0164436 | A1 * | 6/2018 | Johnson | G01S 17/023 |
| 2018/0253093 | A1 * | 9/2018 | Augugliaro | G05D 1/0027 |

* cited by examiner

*Primary Examiner* — Marthe Y Marc-Coleman
(74) *Attorney, Agent, or Firm* — Viering, Jentschura & Partner MBB

(57) ABSTRACT

Herein is disclosed an unmanned aerial vehicle segment-imagery system comprising at least a first unmanned aerial vehicle and a second unmanned aerial vehicle, the first unmanned aerial vehicle further comprising one or more processors, configured to control an aerial movement of the first unmanned aerial vehicle; one or more lasers, configured to emit a laser light; and a laser targeting system, configured to cause the laser to strike a second unmanned aerial vehicle.

15 Claims, 10 Drawing Sheets

| Image | Name | Faces | Edges | Vertices |
|---|---|---|---|---|
| | octahedron | 8 | 12 | 6 |
| | icosahedron | 20 | 30 | 12 |

FIG. 8

LINES

LINE_STRIP

LINE_LOOP

TRIANGLES

TRIANGLE_STRIP

TRIANGLE_FAN

QUADS

QUAD_STRIP

POLYGON

US 10,386,842 B2

UNMANNED AERIAL VEHICLE LIGHT SHOW

TECHNICAL FIELD

Various embodiments relate generally to unmanned aerial vehicles ("UAV") light shows using lasers or fireworks.

BACKGROUND

It is known to create two-dimensional and three-dimensional light shows using UAVs equipped with lights. These UAE lights appear as dots or pixels in the sky and can be arranged in shapes or words. The pixel-formatting used in UAV light shows results in pixelated images of unconnected points which may yield a reduced quality image.

SUMMARY

An unmanned aerial vehicle segment-imagery system comprising at least a first unmanned aerial vehicle and a second unmanned aerial vehicle, the first unmanned aerial vehicle further comprising one or more processors, configured to control an aerial movement of the first unmanned aerial vehicle; one or more lasers, configured to emit a laser light; and a laser targeting system, configured to cause the laser to strike a second unmanned aerial vehicle.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 8 shows a calculation of UAVs and lasers for image creation;

DESCRIPTION

Figure 1:
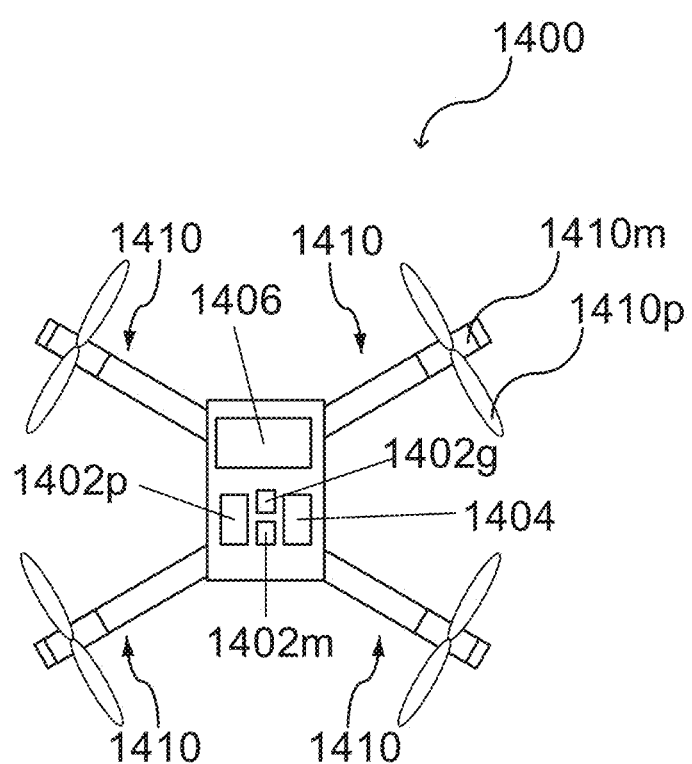
FIG. 1 shows a UAV configuration according to an aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. The one or more drive motors 110$m$ of the unmanned aerial vehicle 100 may be electric drive motors.

Further, the unmanned aerial vehicle 100 may include one or more processors 102$p$ configured to control flight or any other operation of the unmanned aerial vehicle 100 including but not limited to navigation, image analysis, location calculation, and any method or action described herein. One or more of the processors 102$p$ may be part of a flight controller or may implement a flight controller. The one or more processors 102$p$ may be configured, for example, to provide a flight path based at least on an actual position of the unmanned aerial vehicle 100 and a desired target position for the unmanned aerial vehicle 100. In some aspects, the one or more processors 102$p$ may control the unmanned aerial vehicle 100. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories may be implemented by any kind of one or more electronic storing entities, e.g. a one or more volatile memories and/or one or more non-volatile memories. The one or more memories 102$m$ may be used, e.g., in interaction with the one or more processors 102$p$, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 106. The one or more sensors 106 may be configured to monitor a vicinity of the unmanned aerial vehicle 100. The one or more sensors 106 may be configured to detect obstacles in the vicinity of the unmanned aerial vehicle 100. The one or more sensors 106 may include, for example, one or more cameras (e.g., a depth camera, a stereo camera, a thermal imaging camera, etc.), one or more ultrasonic sensors, etc. The unmanned aerial vehicle 100 may further include a position detection system 102g. The position detection system 102g may be based, for example, on Global Positioning System (GPS) or any other available positioning system. Therefore, the one or more processors 102p may be further configured to modify the flight path of the unmanned aerial vehicle 100 based on data obtained from the position detection system 102g. The sensors 106 may be mounted as depicted herein, or in any other configuration suitable for an implementation.

According to various aspects, the one or more processors 102p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102p and/or in additional components coupled to the one or more processors 102p.

Figure 2:
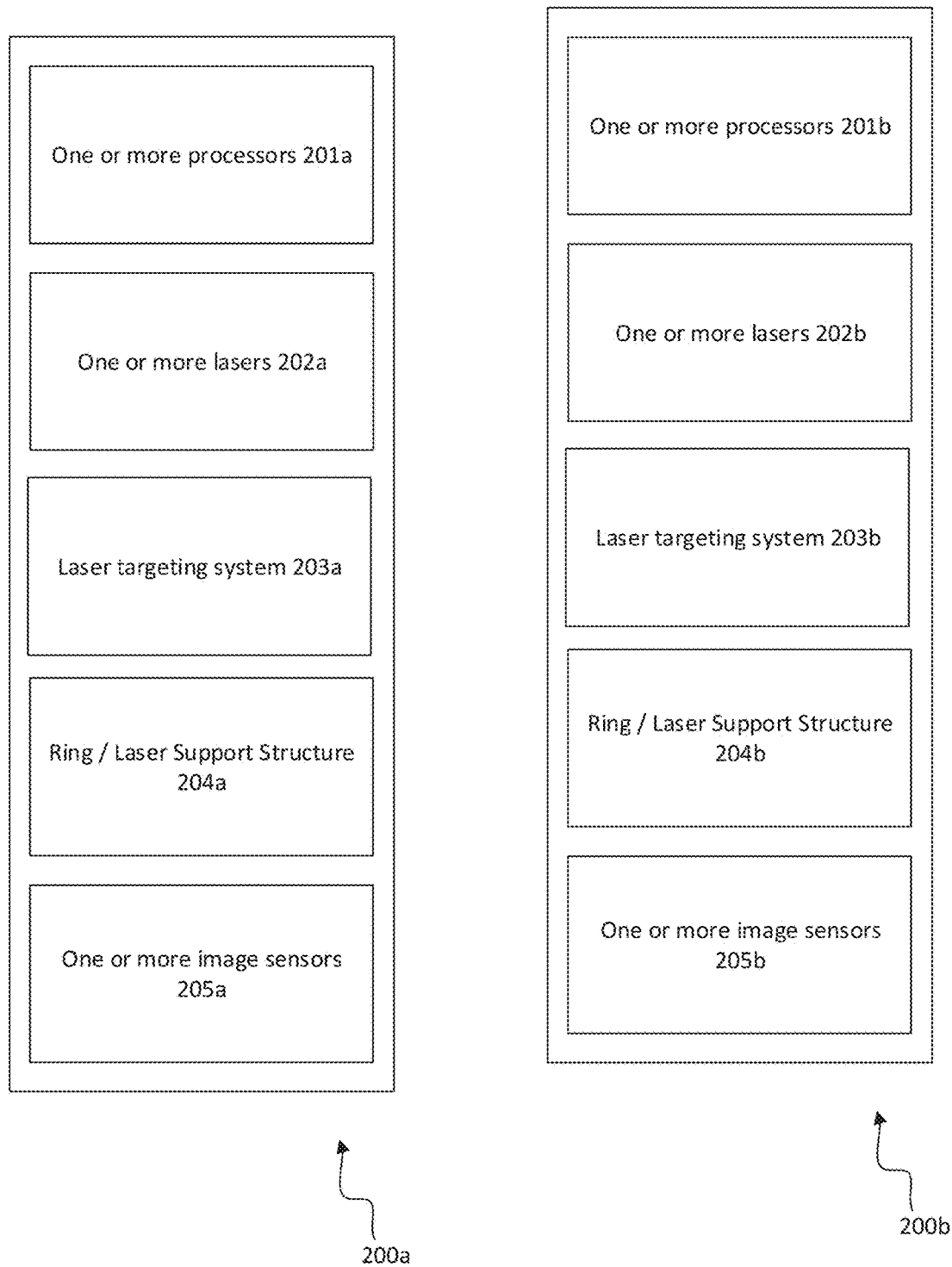
FIG. 2 shows a UAV segment imagery system.

FIG. 2 shows an unmanned aerial vehicle segment-imagery system comprising a first unmanned aerial vehicle 200a and a second unmanned aerial vehicle 200b, wherein the first unmanned aerial 200a vehicle further comprises one or more processors 201a, configured to control an aerial movement of the first unmanned aerial vehicle; one or more lasers 202a, configured to emit a laser light; and a laser targeting system 203a, configured to cause the laser to strike the second unmanned aerial vehicle. At least the first unmanned aerial vehicle may also comprise a ring or laser support structure 204a around a body, a circumference, or a plurality of propeller motors, of the first unmanned aerial vehicle, wherein at least one of the one or more lasers is mounted to the ring.

The first unmanned aerial vehicle 200a may also comprise one or more image sensors 205a, configured to obtain an image of the second unmanned aerial vehicle 200b and provide to the one or more processors 201a image data corresponding to the obtained image; and where the one or more processors 201a are further configured to detect from the image data a position of the second unmanned aerial vehicle 200b; and derive an adjustment instruction based on a relationship between an image position and a target alignment.

The second unmanned aerial vehicle 200b may also comprise one or more processors 201b, one or more lasers 202b, a laser targeting system 203b, a ring laser support structure 204b and/or one or more image sensors 205b configured to obtain an image of the first unmanned aerial vehicle 200a and provide to the one or more processors 201b with image data corresponding to the obtained image; and where the one or more processors 201b are further configured to detect from the image data a position of the first unmanned aerial vehicle 200a; and derive an adjustment instruction based on a relationship between an image position and a target alignment.

Figure 3:
FIG. 3 shows a known method of a UAV light show.

FIG. 3 shows a known type of unmanned aerial vehicle light show. According to this type of light show, UAVs may each be equipped with one or more lights which function as a pixel in a two dimensional light show image. By programming the UAVs to assume positions within the sky, the pixels can be arranged in designs, colors, and/or words to render the desired image. Because the resolution is limited to the number of UAVs in the number of lights on each UAV, the images appear pixelated. The reliance on pixels for image formation precludes the formation of a true line or line segment.

Figure 4:
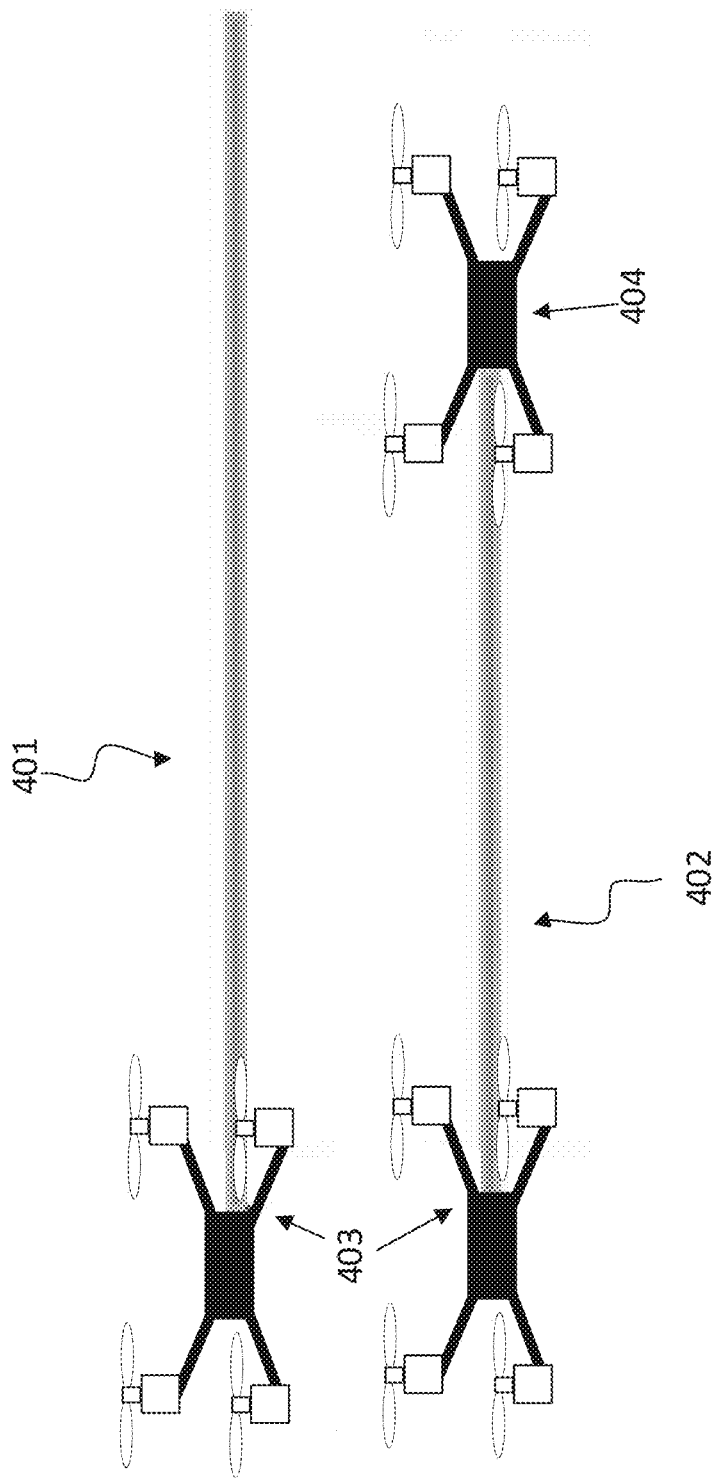
FIG. 4 shows UAV-initiated visible laser lines or line segments.

FIG. 4 shows a technique for creating a line 401 or line segment 402 between UAVs. According to this technique, a first UAV is equipped with a laser 403, which is capable of producing a visible laser light. The visible laser light requires transmission within a visible spectrum, and also transmission with sufficient power as to render the laser light visible due to reflection or refraction from dust, air particles, and/or water particles. According to one aspect of the disclosure, the laser may be a 20 milliwatt laser, although the laser's power may be greater or less than 20 milliwatts, without limitation. The laser light may appear as a collimated light beam. The laser light may appear to extend into infinity, or it may be terminated by a second unmanned aerial vehicle. The first unmanned aerial vehicle 401 is equipped with a laser 403 which extends toward infinity in a visible fashion. According to another aspect of the disclosure, the unmanned aerial vehicle in 402 is equipped with a laser 403 which produces a laser light that extends from the first unmanned aerial vehicle and which terminates at a second unmanned aerial vehicle 404. The second unmanned aerial vehicle 404 may comprise an optional laser termination surface, which may be the body of the UAV, or another surface capable of terminating the laser light. The laser termination surface may be a nonreflective or opaque surface, capable of absorbing the laser light. According to another aspect of the disclosure, the laser termination surface may be a reflective surface which thus functions to terminate a specific direction of the laser but to reflect the laser in a second direction. Where a reflective laser termination services used, the laser may be produced by a first UAV and reflected by a second UAV to a third UAV. By causing a laser light to travel from a first UAV to a termination point at a second UAV, a visible light segment is created. One or more visible light segments may be arranged to create an image based on lines or line segments rather than pixels. These combinations of lines or line segments may be arranged to create 3D polygons, thereby creating a visual image within a UAV light show context with significantly improved graphical quality. Where no dedicated laser termination surface is present, the laser may terminate in the body of the second UAV.

Figure 5:
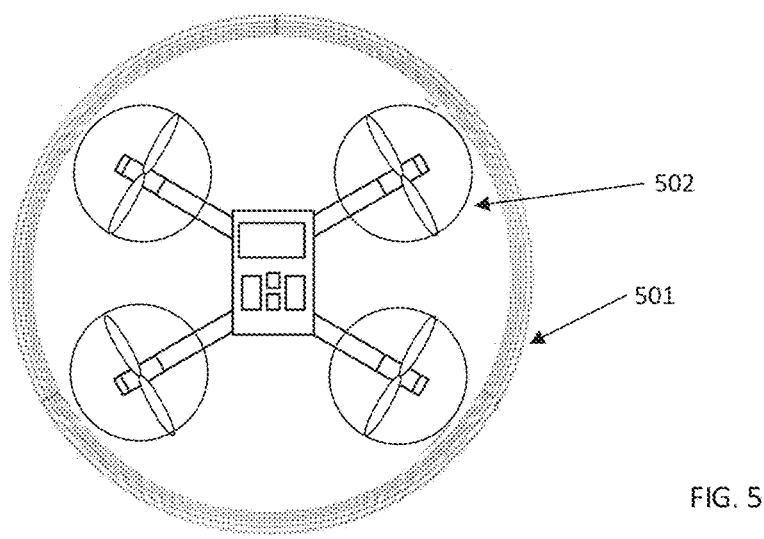
FIG. 5 shows a laser ring or laser support system.

FIG. 5 shows a ring or laser support system 501 according to one aspect of the disclosure. The method described in FIG. 4, above, requires the first UAV to be equipped with one or more lasers. According to one aspect of the disclosure, the lasers may be attached to any existing aspect of the UAV that is otherwise known. However, to improve adjustment capability of laser direction, the UAV may be equipped with a ring or laser support system 501, on which one or more lasers may be mounted. FIG. 5 shows such a ring or laser support system as a ring forming a circumference around a UAV. According to one aspect of the disclosure, the ring or laser support system 501 may be attached to any surface or structure on the UAV. As depicted in FIG. 5, it is known to place a guard or shield 502 around a circumference of the UAV propellers. The ring or laser support system 501 may, according to one aspect of the disclosure, be attached to one or more guards or shields 502. The attachment may, for example, be placed on a distal surface of the guards or shields, as depicted in this figure.

Figure 6:
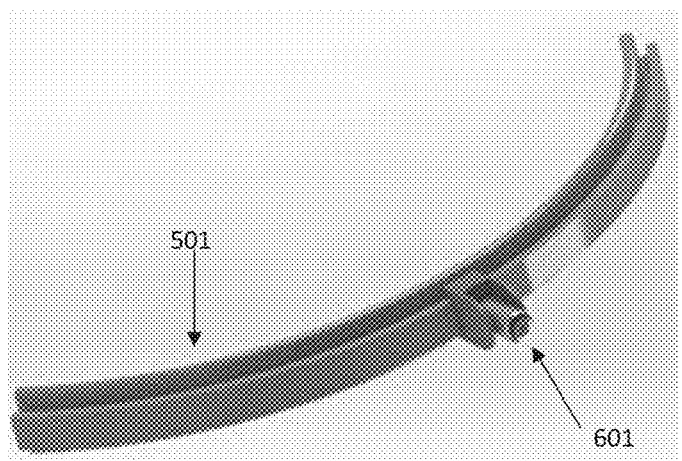
FIG. 6 shows a track and laser configuration of a ring or laser support system.

FIG. 6 shows a laser 601 attached to the ring or laser support 501. Although the ring or laser support may be arranged in any desirable configuration, the ring or laser support may be arranged as a bar or track, which allows movable placement of one or more lasers 601 along the ring or support system. In this case, the laser 601 is located along an external or distal surface of the ring or laser support system. The laser 601 may be affixed to the ring or laser support system 501 such that it cannot be moved to a different surface along the ring or laser support system. Alternatively, the one or more lasers 601 may be adjustably mounted to the ring or laser support system 501 such that the one or more lasers 601 may travel or be moved along the circumference of the ring or laser support system 501. As depicted in FIG. 6 the two track ring or laser support system 501 comprises an inner track that permits the ring or laser support system 501 to be affixed on the interior surface to the UAV, and an outer track which permits the one or more lasers 601 unencumbered flexibility in placement or movement around the exterior track. This configuration allows for a 360° revolving movement of the laser around the UAV.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

Figure 7:
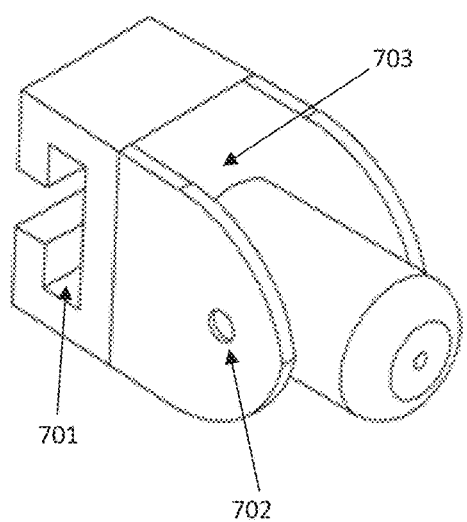
FIG. 7 shows a mount for a ring or laser support system.

FIG. 7 shows a mount for at least biaxial adjustment of the laser direction. The laser mount may include a track receiver 701, which is configured to maintain a connection between the laser and the ring or laser mounting system. The track receiver 701 may be configured to permit adjustable placement around a circumference of the ring or laser support system, or it may be configured to clamp or lock to a specific portion of the ring or laser support system. Where the track receiver 701 is configured for move ability around the ring or laser support system, the track receiver 701 permits the laser to be pointed within a 360° range coplanar with the UAV. The mount may be configured with a pivot point 702 which is configured to allow adjustment of the laser a long a second axis that is substantially perpendicular to the adjustment direction of the track receiver 701. As depicted in FIG. 7 the track receiver 701 permits adjustment that is substantially horizontal, whereas the pivot point 702 permits adjustment that is substantially vertical. According to another aspect of the disclosure, the mount may be configured with an optional rotational axis 703, which is configured to permit a rotation of the laser. The rotational axis 703 permits rotational change in laser light direction, such that, for example, a laser configured in a substantially downward direction may be rotated 45° clockwise with the rotational axis 703 such that the laser points in a substantially leftward direction. At least one of the laser mount, the ring/laser support, and the laser steering capabilities resulting from one or both of the laser mount and ring/laser support are known as the laser targeting system. The laser targeting system allows for increased accuracy in laser targeting. Without the laser targeting system, such as in the case of a fixed laser, the laser must be aimed solely by movement of the UAV, which is impracticable, especially where two or more lasers must be projected from a single UAV. The laser targeting system therefore allows for movement and/or aiming of the laser without necessitating movement or repositioning of the UAV.

FIG. 8 shows examples of image creation and calculation according to an aspect of the disclosure. Because the methods disclosed herein permit line or line segment created polygons, rather than polygon-approximated shapes comprising a plurality of pixels, it is possible to create three dimensional shapes with greater clarity and using a fewer number of UAVs. The minimum number of UAVs required is the number of vertices for any given shape or design. The number of lasers required per UAV may be calculated as a function of the number of edges with respect to the number of vertices, as follows:

$$NumLasersPerUAV = \frac{NumberOfEdges}{NumberOfVertices} \qquad (1)$$

wherein a non-integer result is rounded up. FIG. 8 shows an analysis of sample shapes for calculation of the number of lasers per UAV. In the case of the octahedron, the shape has six vertices and therefore will require a minimum of six UAVs. Because an octahedron and has twelve edges and six vertices, each UAV must be equipped with at least two lasers. In the case of the icosahedron, which contains thirty edges and twelve vertices, a minimum of twelve UAVs will be necessary. Because the result for the icosahedron according to Formula (1) is 2.5, which is a non-integer, the result is rounded up to three, thereby requiring three lasers per UAV.

Figure 9:
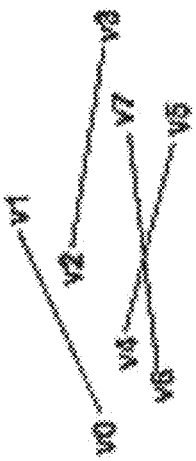
FIG. 9 shows a sample line and polygon array for 3D image creation.
Figure 9:
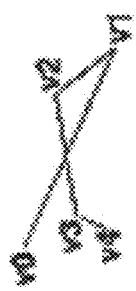
Figure 9:
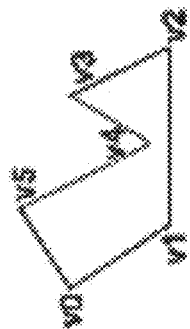
Figure 9:
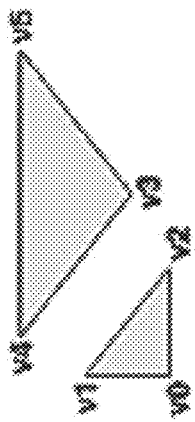
Figure 9:
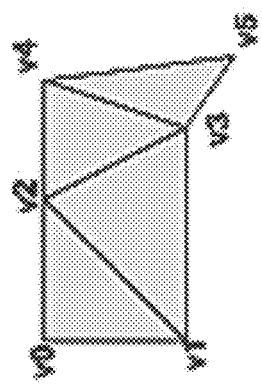
Figure 9:
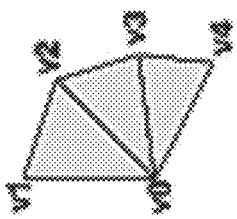
Figure 9:
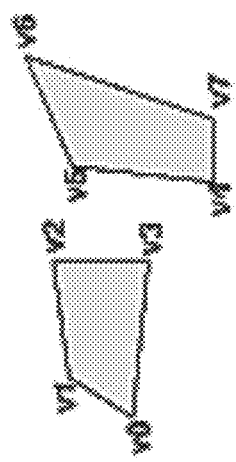
Figure 9:
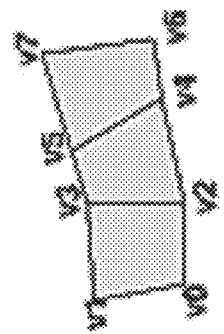
Figure 9:
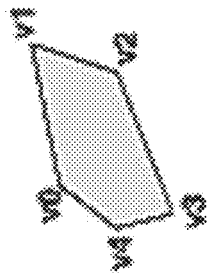

FIG. 9 depicts a sample variety of shapes and/or designs that may be created according to the methods disclosed herein. Using a first UAV equipped with a laser and a second UAV equipped with a laser terminator, and expanding this technique to increase the number of UAVs and lasers as described in FIG. 9, an unlimited variety of lines, line segments, and polygons may be created. Without limitation, FIG. 9 depicts the creations of lines, line strips, line loops, triangles, triangle strips, triangle fans, quads, quad strips, and polygons.

Figure 10:
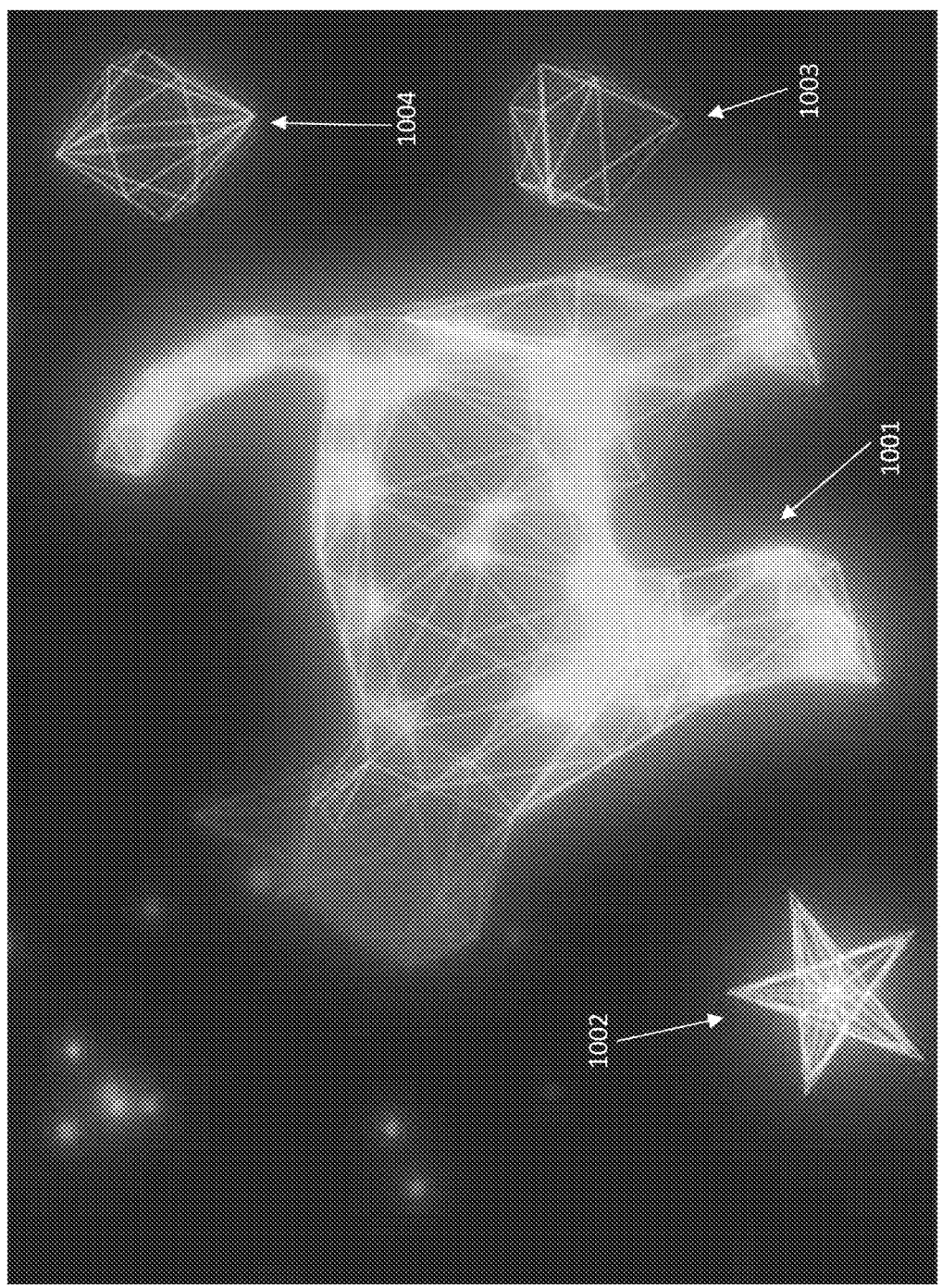
FIG. 10 shows 3D line-based polygon images in a UAV light show.

FIG. 10 shows sample images within a UAV light show according to the methods described herein. In this Figure, a plurality of UAVs are equipped with lasers and/or laser terminators to create a variety of three-dimensional shapes within the sky. In these examples, the UAVs are configured to form a cat 1001, a three-dimensional star 1002, a first jewel cut 1003, and a second jewel cut 1004. Of note, the images depicted herein are not limited to simple geometric shapes, but rather can be complex, line-based polygons to depict essentially any kind of shape. The shapes may include a synthesis of a plurality of similar polygons, of a plurality of different polygons, or otherwise. The three dimensional polygon shape, and the line arrangement according thereto, may be derived from a computer graphics program. For example, a drawing of a cat may be placed into a three-dimensional line-based polygon graphics program, which may derive from the CAD drawing a line-based polygon version of the cat to resemble the cat in 1001. Using these methods, nearly any three-dimensional shape can be depicted in the sky, in higher graphics resolution than would be possible with a plurality of UAV-based pixels.

Figure 11:
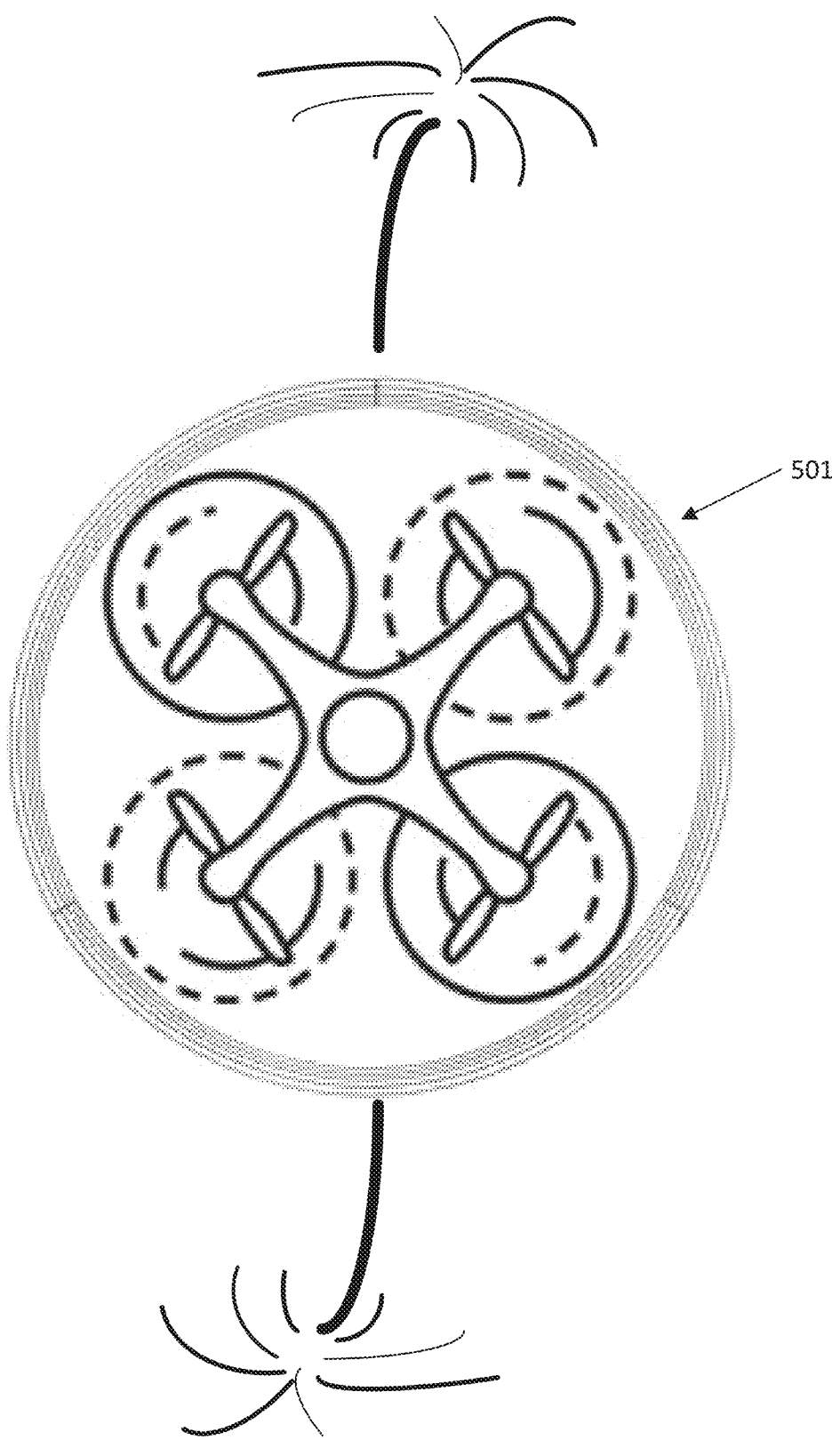
FIG. 11 shows a method of a UAV segment imagery.

FIG. 11 shows a configuration according to another aspect of the disclosure, wherein the ring 501 is equipped with one or more firework holders for incorporation of fireworks into a UAV light show. Firework-based light shows traditionally include rapid firing of a comparatively large number of fireworks in the final portion of the show, which may be known as the "grand finale". As a means of increasing excitement during a select portion of the UAV light show in a manner comparable to the grand finale, the UAVs may be equipped with firework holders and an ignition device, which permits firing of fireworks in addition to, or instead of, the UAV-based light show. The fireworks may be any kind of firework without limitation. The fireworks may include, but are not limited to, sprinklers. Although the UAV in FIG. 11 is depicted as having two fireworks, the UAV may be equipped with any number of fireworks. During the firing of a firework, the UAV may be programmed to rotate.

Figure 12:
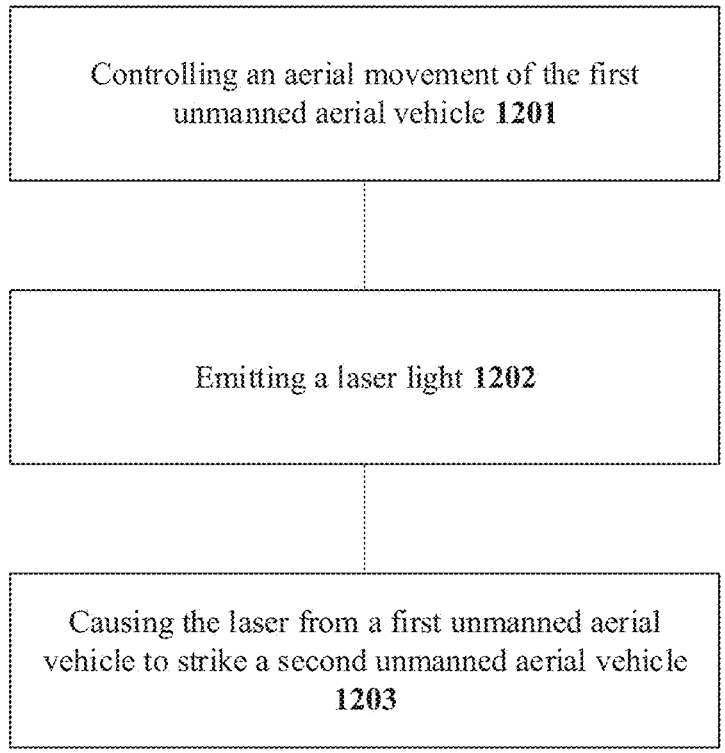
FIG. 12 shows a method of unmanned aerial vehicle segment-imagery according to an aspect of the Disclosure.

FIG. 12 shows a method of unmanned aerial vehicle segment-imagery comprising controlling an aerial movement of the first unmanned aerial vehicle 1201; emitting a laser light 1202; and causing the laser from a first unmanned aerial vehicle to strike a second unmanned aerial vehicle 1203.

The UAV imagery system includes at least two UAVs, which are equipped for production and termination of a laser light, respectively. The first UAV may comprise one or more processors, which are configured to control the aerial movement of the first UAV. These processors may control the UAV with respect to ignition, takeoff, flight, location or locations within the light show, position or positions within the light show, and landing, according to a predetermined flight plan. The one or more processors may further control one or more lasers, including a start time, stop time, intensity, and/or color. The first UAV may be equipped with one or more lasers, which are configured to emit a laser light. Thus, the first UAV travels according to a flight plan, which may include multiple points of destination within the sky during the context of a light show, and the one or more processors control the one or more lasers to emit light at predetermined times for the purpose of creating images, words, or graphics within the sky.

The second UAV comprises one or more processors which are configured to control the aerial movement of the second UAV including, but not limited to, ignition, takeoff, flight, location or locations within the light show, position or positions within the light show, and landing. The second UAV may be further equipped with one or more laser terminators, which are services configured to terminate a received laser light. The laser terminator may be simply the body of the second UAV, wherein a laser light from a first UAV strikes the body of the second UAV, where the light substantially terminates. The laser terminator may be a surface specifically dedicated for laser termination, such as an opaque or nonreflective surface. The service may be sized according to a size of the laser light to be received, and a tolerance for positioning. The laser terminator may extend off of the second UAV. The laser terminator may be oversized, such as to create a large area for receipt of the laser light and termination thereof. The laser terminator may be colored based on an anticipated surrounding, such that the laser terminator becomes invisible or inconspicuous during the light show. For example, a laser terminator may be configured to be black for use with a nighttime light show. A laser terminator may be configured to be blue or white for use during a daytime light show.

According to one aspect of the disclosure, a UAV may comprise both a laser and a laser terminator. Under this configuration, a single UAV may function as the first UAV wherein it produces a laser light for termination elsewhere, and it may function as the second UAV wherein it receives a laser light from elsewhere and terminates that light. This configuration may be common, such as in a vertex wherein laser light is both generated and terminated.

The laser may be housed on a laser support system. The laser support system may be, but need not be, configured as a ring around an external circumference of the UAV. It is particularly noted that UAVs come in a variety of shapes including, but not limited to substantially circular, substantially square, V-shaped, and otherwise. A laser support system may be created in a shape which corresponds to the shape of the UAV. To the extent that a laser support system is depicted as a ring herein, it is for convenience purposes only and not intended to be limiting.

Whatever the shape of the support system, one or more lasers may be mounted to the support system. The lasers may be fixedly mounted to the support system, such that their position with respect to the edges or circumference of the UAV is fixed or unmovable. Alternatively, the lasers may be adjustably mounted to the support system, such that the lasers may be repositioned to a different area within the circumference of the UAV. This repositioning may occur before or during flight. The one or more lasers may be positioned on the ring before flight in a stationary manner, such that their position is fixed with respect to the UAV circumference throughout the duration of the light show. Alternatively, the one or more lasers may be configured to move about the circumference of the UAV during the course of the light show. Such movement-enabled lasers may be equipped with a motor or other system capable of causing the lasers to move about the circumference of the UAV. According to one aspect of the disclosure, such movement of the lasers about the circumference of the UAV may be controlled by the laser targeting system. The laser targeting system may be configured to control the laser mount to move, and one or more laser pivots to aim a laser such that the laser terminates in a second UAV.

The one or more lasers may be attached to the laser support system by a laser mount. The laser mount, as described above, may be equipped with a support receiving and, capable of maintaining a connection to the laser support system. The laser mount may be equipped with a motor capable of causing the laser to revolve around the laser support system. This motor and the corresponding revolution of the laser and laser mount may be controlled by the one or more processors. The laser mount may comprise one or more additional axes for further control of the laser direction. Specifically, the laser mount may include a first axis that allows the laser to move in a direction substantially perpendicular to the direction of revolution allowed by the laser support and support-receiving element.

The laser mount may include a second axis for rotation of the laser. This second axis may permit the laser to rotate within the mount, which may permit a change of the laser angle according to the first axis. That is, and for example only, where the first axis causes the laser to point in a downward direction with respect to the UAV, a 45° clockwise rotation with the second axis may cause the laser two point in a leftward direction.

The type of laser used for the one or more lasers may be any laser capable of emitting light within a spectrum visible to the human eye, and capable of emitting light that appears visible between the point of origin and the termination point. For example, although it is known to use lasers as pointing devices for public presentations, many such lasers produce a visible light at a point of termination, but the light is not visible between the source of origin and the point of termination. However, as laser power increases, the laser light becomes reflected or refracted by air particles, dust particles and/or water moisture within the air, which renders the laser light visible to the human eye between the laser origin and the point of termination. Such lasers may appear to the human eye as a line of collimated light. Any laser capable of such visibility between a laser origin and a point of termination may be used herein. Without limitation, the laser may specifically be a gas laser, a chemical laser, a dye laser, a metal-vapor laser, a solid state laser, and/or a semiconductor laser.

Because three-dimensional image creation using line segments requires a laser emitted by a first UAV to be terminated by a second UAV, such configuration offers limited tolerance for UAV position. In a UAV light show, the plurality of UAVs are typically programmed to achieve a variety of coordinates at specific times in order to project light from a desired location. One known method of approximating a desired position is to use coordinates according to the global positioning system. According to this model, UAVs may be equipped with a global positioning system circuit, which allows the UAVs to synchronize with a plurality of global positioning system satellites, and thereby obtain an absolute position according to the global positioning system. The preprogrammed light show coordinates can be used alongside information obtained from the global positioning system to achieve or approximate desired positions for production or termination of laser light.

Due to limitations of the global positioning system, however, it may be impossible or impracticable to reach the predetermined positions with high accuracy. This may be due to global positioning system drift, or limitations in the onboard global positioning system circuitry. The accuracy required for laser termination by a second UAV of the laser produced by a first UAV may exceed the accuracy available using the global positioning system for a particular UAV implementation. Under such circumstances, it may be necessary to employ an additional targeting system to improve navigational accuracy.

One or more image sensors can be used to improve the laser targeting accuracy. According to this method, the first UAV may be equipped with one or more image sensors, which are configured to obtain an image of a second UAV, such as a UAV to terminate laser light emitted by the first UAV. The one or more processors may be equipped to analyze the image data to determine a locational relationship between the first UAV and the second UAV, and to use the laser targeting system to aim or steer the laser to the second UAV. The location of the second UAV is generally known in a light show; however, the laser targeting system is able to overcome divergences from a programmed position, which can occur due to GPS drift, wind, obstacles, or otherwise. The one or more processors may determine a location of the second UAV and cause the laser targeting system to adjust the laser direction such that the laser is caused to terminate in the actual position of the second UAV. Alternatively or additionally, the one or more processors may cause the first UAV to adjust its position or location to redirect the laser toward the second UAV. The one or more processors may send a signal to the second UAV to adjust its position accordingly.

The navigational analysis may additionally or alternatively be performed by the second UAV. That is, the second UAV (the UAV for light termination) may include one or more image sensors which are configured to obtain images of one or more additional UAVs, as described above. The second UAV may determine from these images an adjustment instruction, which may require positional adjustment of the laser on the first UAV, the first UAV itself, the second UAV itself, both. Where the adjustment instruction requires repositioning of the first UAV, this adjustment instruction may be transmitted from the second UAV to the first UAV, whether directly, or using an intermediary device.

Where an adjustment instruction must be transmitted between UAVs, the UAVs may be further equipped with a transceiver, capable of receiving or transmitting at least an adjustment instruction.

According to one aspect of the disclosure, the one or more processors may be further configured to determine an adjustment instruction from an image obtained by the one or more image sensors. The UAV may alternatively be equipped with an additional processing circuit four such image processing, such that the one or more processors as described herein perform the remaining navigational tasks, but the additional processing circuit determines the adjustment instruction.

The adjustment instruction may be determined according to a target alignment. A person skilled in the art will understand the target alignment to be a refined alignment derived from at least an image obtained from the one or more image sensors. The target alignment is an alignment that will permit termination of the emitted laser light within a tolerance of an ideal programmed form or shape. Although each shape in the light show results from a plurality of UAVs emitting laser light from predetermined coordinates, it may be possible to appreciate in approximate version of the ideal shape wherein one or more UAVs are not located exactly at the specified coordinates, but rather within a vicinity of the specified coordinates. This difference between the specified coordinate and the vicinity of the specified coordinate is a coordinate tolerance. The target alignment is in alignment within a coordinate tolerance that permits termination of the UAV light. The target alignment may permit termination of the UAV light in such a way that the desired figure may still be appreciated.

According to one aspect of the disclosure, a UAV may be configured to emit a laser light that is not terminated. Terminating the laser light results in a line segment which can be used to build three-dimensional shapes or figures. It may be desirable to omit one or more laser lights that are not terminated and thereby are viewed as a line, as opposed to a line segment, wherein the line extends uninterrupted. The uninterrupted line may appear to a spectator as extending substantially toward infinity.

According to another aspect of the disclosure, one or more UAVs may be further configured for fireworks display within the light show. That is, it may be possible to incorporate fireworks within a UAV light show. The fireworks may augment a UAV light within the light show context. Where such fireworks are desired, one or more UAVs may further be equipped with an ignition device that is configured to ignite a pyrotechnic, and a pyrotechnic storage device, which is configured to store a pyrotechnic. The UAV may be preprogrammed to cause the ignition device to ignite the pyrotechnic at a predetermined time. Upon ignition, the pyrotechnic will emit light, smoke, and/or sound. Such pyrotechnic use may add visual or auditory interest to a UAV light show.

The ignition device may be any device whatsoever capable of igniting a pyrotechnic. This may include an electronic ignition device, a flame-based devised, a heat-based device, a light-based device, or otherwise. The UAV may be programmed to cause the ignition device to ignite a pyrotechnic upon a specific time within the light show, upon a specific sequence of events, upon reaching a predetermined location, or upon any other pyrotechnic trigger.

Where a pyrotechnic is ignited, the UAV may be configured for movement to enhance pyrotechnic visibility. For example, and without limitation, the UAV may be programmed to spin, revolve, or rotate during pyrotechnic combustion. Such UAV movement may appear to increase in area of pyrotechnic combustion, or change or increase the direction of pyrotechnic combustion. Such UAV movement may increase brightness or rapidity of pyrotechnic combustion by increasing airflow to the pyrotechnic.

The pyrotechnic may be any pyrotechnic capable of omitting light, smoke, or sound. The type of pyrotechnic may include, without limitation, sparklers, Roman candles, firecrackers, or fireworks.

The pyrotechnic storage device may be any device capable of holding a pyrotechnic during combustion. The pyrotechnic storage device may be designed to hold the pyrotechnic in such a manner that reduces or minimizes damage to the UAV through the burning pyrotechnic. This may include holding the pyrotechnic in such a manner that its burning region is located at an opposite end of the pyrotechnic from the UAV. The pyrotechnic storage device may be shielded from heat or flammability to further protect the UAV from the burning pyrotechnic.

The UAV may be equipped with a heat sensor for detection of UAV damage during pyrotechnic use. The heat sensor may sense heat within a vicinity of the UAV in accordance with a predetermined threshold, such that the heat sensor is designed to determine the likelihood of damage to the UAV from pyrotechnic heat. The predetermined threshold may be selected as a threshold at which UAV material may be damaged, such as a melting point or a combustion point.

The UAV may be configured to avoid aiming the lasers in a downward direction or in a direction of viewers. To avoid contact between lasers and viewers, the UAV and/or laser aiming system may be configured to cause the lasers to aim horizontally and/or upwards, but to avoid aiming lasers in a downward direction. That is, where a polygon, or any other shape, includes lines other than lines with a completely horizontal slope, the UAVs will be configured to provide the laser light from the bottom up, rather than from the top down. In the event that a laser is caused not to terminate on a second UAV, bottom up configuration will cause the uninterrupted laser to beam upwards, where it less likely to strike a living being. This configuration may increase the number of lasers that are required for a light show. Either alternatively, or in addition, the UAVs may be programmed to avoid high areas of viewer concentration. The one or more processors may be configured with areas in which a density of viewers exceed a predetermined threshold, such as with a crowd, and the UAV may be configured not to permit a laser to be aimed in the direction of such a group. In such cases, the laser may be omitted, or the laser may be configured, as described above, to be directed upward rather than downward.

Where the heat sensor detects heat above the predetermined threshold, the one or more processors may initiate a combustion mode sequence. The combustion mode sequence may be designed to protect the UAV and/or persons or objects within a vicinity of the UAV. The combustion mode sequence may include disabling of a laser light, disabling of one or more propellers, and-/or discontinuation of participation within the light show and landing. For safety purposes, where the one or more processors determine damage to the UAV, whether through the heat sensors or otherwise, the one or more processors may be configured to disable one or more propellers. Although this may result in a crash landing, such action may reduce hazards to the public created by rapidly rotating propeller blades.

The unmanned aerial vehicle, according to various aspects, may include a camera gimbal having an independent two- or three-axes degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the drone, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propeller has one or more propeller blades. The propellers may be fixed pitch propellers.

In the following, various examples are provided with reference to the aspects described above.

In Example 1, an unmanned aerial vehicle segment-imagery system is disclosed comprising at least a first unmanned aerial vehicle and a second unmanned aerial vehicle, the first unmanned aerial vehicle further comprising one or more processors, configured to control an aerial movement of the first unmanned aerial vehicle; one or more lasers, configured to emit a laser light;
and a laser targeting system, configured to cause the laser to strike a second unmanned aerial vehicle.

In Example 2, the unmanned aerial vehicle segment-imagery system of claim 1 is disclosed, further comprising a ring around a circumference of the first unmanned aerial vehicle is disclosed, wherein at least one of the one or more lasers is mounted to the ring.

In Example 3, the unmanned aerial vehicle segment-imagery system of claim 1 is disclosed, further comprising a laser support structure around a body of the first unmanned aerial vehicle is disclosed, wherein at least one of the one or more lasers is mounted to the laser support structure.

In Example 4, the unmanned aerial vehicle segment-imagery system of claim 1 is disclosed, further comprising a laser support structure around one or more propeller motors of the first unmanned aerial vehicle is disclosed, wherein at least one of the one or more lasers is mounted to the laser support structure.

In Example 5, the unmanned aerial vehicle segment-imagery system of any one of claims 1 to 4 is disclosed, wherein the one or more lasers are adjustably mounted to the first unmanned aerial vehicle.

In Example 6, the unmanned aerial vehicle segment-imagery system of any one of claims 1 to 4 is disclosed, wherein the one or more lasers are adjustably mounted to the first unmanned aerial vehicle ring.

In Example 7, the unmanned aerial vehicle segment-imagery system of any one of claims 1 to 4 is disclosed, wherein the one or more lasers are adjustably mounted to the first unmanned aerial vehicle laser support structure.

In Example 8, the unmanned aerial vehicle segment-imagery system of any one of claims 1 to 7 is disclosed, wherein the one or more lasers are gas lasers.

In Example 9, the unmanned aerial vehicle segment-imagery system of any one of claims 1 to 7 is disclosed, wherein the one or more lasers are chemical lasers.

In Example 10, the unmanned aerial vehicle segment-imagery system of any one of claims 1 to 7 is disclosed, wherein the one or more lasers are dye lasers.

In Example 11, the unmanned aerial vehicle segment-imagery system of any one of claims 1 to 7 is disclosed, wherein the one or more lasers are metal-vapor lasers.

In Example 12, the unmanned aerial vehicle segment-imagery system of any one of claims 1 to 7 is disclosed, wherein the one or more lasers are solid state lasers.

In Example 13, the unmanned aerial vehicle segment-imagery system of any one of claims 1 to 7 is disclosed, wherein the one or more lasers are semiconductor lasers.

In Example 14, the unmanned aerial vehicle segment-imagery system of any one of claims 1 to 13 is disclosed, wherein the one or more lasers are configured to produce a laser light within the visible spectrum.

In Example 15, the unmanned aerial vehicle segment-imagery system of any one of claims 1 to 14 is disclosed, wherein the one or more lasers are configured to produce a laser light that is visible between the laser and the laser terminator.

In Example 16, the unmanned aerial vehicle segment-imagery system of any one of claims 1 to 15 is disclosed, wherein the laser terminator is a body of the second unmanned aerial vehicle.

In Example 17, the unmanned aerial vehicle segment-imagery system of any one of claims 1 to 16 is disclosed, wherein the laser terminator is a non-reflective surface In Example 18, the unmanned aerial vehicle segment-imagery system of claim 17 is disclosed, wherein the non-reflective surface is mounted to the second unmanned aerial vehicle;

In Example 19, the unmanned aerial vehicle segment-imagery system of claim 17 or 18 is disclosed, wherein the non-reflective surface is configured to absorb the laser light.

In Example 20, the unmanned aerial vehicle segment-imagery system of any one of claims 1 to 15, where the laser targeting system is configured to direct the one or more lasers in a preprogrammed direction.

In Example 21, the unmanned aerial vehicle segment-imagery system of any one of claims 1 to 20 is disclosed, wherein the first unmanned aerial vehicle further comprises one or more image sensors, configured to:
obtain an image of the second unmanned aerial vehicle and provide to the one or more processors image data corresponding to the obtained image;
and where the one or more processors are further configured to
detect from the image data a position of the second unmanned aerial vehicle; and
determine an adjustment instruction based on the image position to cause the one or more lasers to strike the second unmanned aerial vehicle.

In Example 22, the unmanned aerial vehicle segment-imagery system of claim 21 is disclosed, wherein the adjustment instruction is an instruction to cause the laser targeting system to modify a laser direction, such that a laser on the first unmanned aerial vehicle terminates on the second aerial vehicle.

In Example 23, the unmanned aerial vehicle segment-imagery system of any one of claims 1 to 23 is disclosed, wherein the second unmanned aerial vehicle further comprises one or more image sensors, configured to:
obtain an image of the first unmanned aerial vehicle and provide to the one or more processors image data corresponding to the obtained image;
and where the one or more processors are further configured to
detect from the image data a position of the first unmanned aerial vehicle; and
derive an adjustment instruction based on a relationship between an image position and a target alignment.

In Example 24, the unmanned aerial vehicle segment-imagery system of claim 23 is disclosed, wherein the adjustment instruction is an instruction to cause the first unmanned aerial vehicle to navigate to an adjusted location, such that a laser on the first unmanned aerial vehicle terminates on the second aerial vehicle.

In Example 25, the unmanned aerial vehicle segment-imagery system of claim 23 is disclosed, wherein the adjustment instruction is an instruction to cause a laser on the first unmanned aerial vehicle to change alignment such that the laser terminates on the second unmanned aerial vehicle.

In Example 26, the unmanned aerial vehicle segment-imagery system of claim 23 is disclosed, wherein the adjustment instruction is an instruction to cause the second unmanned aerial vehicle to navigate to an adjusted location, such that a laser on the first unmanned aerial vehicle terminates on the second aerial vehicle.

In Example 27, the unmanned aerial vehicle segment-imagery system of any one of claims 23 to 26 is disclosed, further comprising a transceiver, configured to transmit or receive an adjustment instruction.

In Example 28, the unmanned aerial vehicle segment-imagery system of any one of claims 1 to 27 is disclosed, wherein at least one unmanned aerial vehicle further comprises
an ignition device, configured to ignite a pyrotechnic, and
a pyrotechnic storage, configured to store a pyrotechnic.

In Example 29, the unmanned aerial vehicle segment-imagery system of claim 28 is disclosed, wherein the one or more processors are further configured to control the ignition device to ignite the pyrotechnic.

In Example 30, the unmanned aerial vehicle segment-imagery system of claim 28 or 29 is disclosed, wherein the one or more processors are further configured to cause the unmanned aerial vehicle to rotate during a combustion period of the pyrotechnic.

In Example 31, the unmanned aerial vehicle segment-imagery system of any one of claims 28 to 30 is disclosed, further comprising a heat sensor, configured to detect heat above a predetermined threshold.

In Example 32, the unmanned aerial vehicle segment-imagery system of claim 31 is disclosed, wherein the one or more processors are further configured to disable one or more motors upon the heat sensor detecting heat above the predetermined threshold.

In Example 33, the unmanned aerial vehicle segment-imagery system of any one of claims 1 to 32 is disclosed, wherein the laser targeting system is further configured to aim only horizontally or upward.

In Example 34, the unmanned aerial vehicle segment-imagery system of any one of claims 1 to 32 is disclosed, wherein the laser targeting system is further configured to avoid aiming the one or more lasers in a downward direction.

In Example 35, the unmanned aerial vehicle segment-imagery system of any one of claims 1 to 34 is disclosed, wherein the one or more processors are programmed with one or more viewer locations comprising person exceeding a viewer density, and wherein the laser targeting system is configured to avoid aiming lasers toward the one or more viewer locations.

In Example 36, a method of unmanned aerial vehicle segment-imagery is disclosed comprising:
controlling an aerial movement of the first unmanned aerial vehicle;
emitting a laser light; and
causing the laser from a first unmanned aerial vehicle to strike a second unmanned aerial vehicle.

In Example 37, the method of unmanned aerial vehicle segment-imagery of claim 36 is disclosed, wherein at least one of the one or more lasers is mounted to a ring surrounding the first unmanned aerial vehicle.

In Example 38, the method of unmanned aerial vehicle segment-imagery of claim 36 is disclosed, wherein at least one of the one or more lasers is mounted to the laser support structure around a body of the first unmanned aerial vehicle.

In Example 39, the method of unmanned aerial vehicle segment-imagery of claim 36 is disclosed, wherein at least one of the one or more lasers is mounted to the laser support structure around one or more propeller motors of the first unmanned aerial vehicle.

In Example 40, the method of unmanned aerial vehicle segment-imagery of any one of claims 36 to 39 is disclosed, further comprising adjustably mounting one or more lasers to the first unmanned aerial vehicle.

In Example 41, the method of unmanned aerial vehicle segment-imagery of any one of claims 36 to 40 is disclosed, wherein the laser light is a laser light within the visible spectrum.

In Example 42, the method of unmanned aerial vehicle segment-imagery of any one of claims 36 to 41 is disclosed, wherein the laser light is visible between the laser and the laser terminator.

In Example 43, the method of unmanned aerial vehicle segment-imagery of any one of claims 36 to 42 is disclosed, wherein the laser light terminates in a body of the second unmanned aerial vehicle.

In Example 44, the method of unmanned aerial vehicle segment-imagery of any one of claims 36 to 42 is disclosed, wherein the laser light terminates in laser terminator on the second unmanned aerial vehicle.

In Example 45, the method of unmanned aerial vehicle segment-imagery of any one of claims 36 to 44 is disclosed, further comprising directing the one or more lasers in a preprogrammed direction.

In Example 46, the method of unmanned aerial vehicle segment-imagery of any one of claims 36 to 45 is disclosed, further comprising:
obtaining an image of the second unmanned aerial vehicle;
detecting from the image a position of the second unmanned aerial vehicle; and
determining an adjustment instruction based on the image position to cause the one or more lasers to strike the second unmanned aerial vehicle.

In Example 47, the method of unmanned aerial vehicle segment-imagery of claim 46 is disclosed, wherein the adjustment instruction is an instruction to cause the laser targeting system to modify a laser direction, such that a laser on the first unmanned aerial vehicle terminates on the second aerial vehicle.

In Example 48, the method of unmanned aerial vehicle segment-imagery of any one of claims 36 to 47 is disclosed, further comprising the second unmanned aerial vehicle:
obtaining an image of the first unmanned aerial vehicle;
detecting from the image a position of the first unmanned aerial vehicle; and
deriving an adjustment instruction based on a relationship between an image position and a target alignment.

In Example 49, the method of unmanned aerial vehicle segment-imagery of claim 48 is disclosed, wherein the adjustment instruction is an instruction to cause the first unmanned aerial vehicle to navigate to an adjusted location, such that a laser on the first unmanned aerial vehicle terminates on the second aerial vehicle.

In Example 50, the method of unmanned aerial vehicle segment-imagery of claim 48 is disclosed, wherein the adjustment instruction is an instruction to cause a laser on the first unmanned aerial vehicle to change alignment such that the laser terminates on the second unmanned aerial vehicle.

In Example 51, the method of unmanned aerial vehicle segment-imagery of claim 48 is disclosed, wherein the adjustment instruction is an instruction to cause the second unmanned aerial vehicle to navigate to an adjusted location, such that a laser on the first unmanned aerial vehicle terminates on the second aerial vehicle.

In Example 52, the method of unmanned aerial vehicle segment-imagery of any one of claims 36 to 51 is disclosed, further comprising a transceiver, configured to transmit or receive an adjustment instruction.

In Example 53, the method of unmanned aerial vehicle segment-imagery of any one of claims 36 to 52 is disclosed, further comprising igniting a pyrotechnic.

In Example 54, the method of unmanned aerial vehicle segment-imagery of claim 53 is disclosed, further comprising rotating during a combustion period of the pyrotechnic.

In Example 55, the method of unmanned aerial vehicle segment-imagery of any one of claims 36 to 54 is disclosed, further comprising detecting heat above a predetermined threshold.

In Example 56, the method of unmanned aerial vehicle segment-imagery of claim 55 is disclosed, further comprising disabling one or more motors upon detecting heat above the predetermined threshold.

In Example 57, the method of unmanned aerial vehicle segment-imagery of any one of claims 36 to 56 is disclosed, further comprising aiming the laser light only horizontally or upward.

In Example 58, the method of unmanned aerial vehicle segment-imagery of any one of claims 36 to 57 is disclosed, further comprising avoid aiming the laser light in a downward direction.

In Example 59, the method of unmanned aerial vehicle segment-imagery of any one of claims 36 to 57 is disclosed, further comprising avoiding aiming laser light toward a viewer location exceeding a predetermined density.

In Example 60, a means of unmanned aerial vehicle segment-imagery is disclosed comprising a first unmanned aerial vehicle and a second unmanned aerial vehicle, the first unmanned aerial vehicle further comprising:

one or more processing means, configured to control an aerial movement of the first unmanned aerial vehicle;

one or more laser light emitting means, configured to emit a laser light;

and a laser targeting means, configured to cause the laser to strike a second unmanned aerial vehicle.

In Example 61, the means of unmanned aerial vehicle segment-imagery of claim 60 is disclosed, further comprising a circular supporting means around a circumference of the first unmanned aerial vehicle is disclosed, wherein at least one of the one or more laser light emitting means is mounted to the circular supporting means.

In Example 62, the means of unmanned aerial vehicle segment-imagery of claim 60 is disclosed, further comprising a laser supporting means around a body of the first unmanned aerial vehicle is disclosed, wherein at least one of the one or more laser light emitting means is mounted to the laser supporting means.

In Example 63, the means of unmanned aerial vehicle segment-imagery of claim 60 is disclosed, further comprising a laser supporting means around one or more propeller motors of the first unmanned aerial vehicle is disclosed, wherein at least one of the one or more laser light emitting means is mounted to the laser supporting means.

In Example 64, the means of unmanned aerial vehicle segment-imagery of any one of claims 60 to 63 is disclosed, wherein the one or more laser light emitting means are adjustably mounted to the first unmanned aerial vehicle.

In Example 65, the means of unmanned aerial vehicle segment-imagery of any one of claims 60 to 63 is disclosed, wherein the one or more laser light emitting means are adjustably mounted to the first unmanned aerial vehicle circular supporting means.

In Example 66, the means of unmanned aerial vehicle segment-imagery of any one of claims 60 to 63 is disclosed, wherein the one or more laser light emitting means are adjustably mounted to the first unmanned aerial vehicle laser supporting means.

In Example 67, the means of unmanned aerial vehicle segment-imagery of any one of claims 60 to 66 is disclosed, wherein the one or more laser light emitting means are gas laser light emitting means.

In Example 68, the means of unmanned aerial vehicle segment-imagery of any one of claims 60 to 66 is disclosed, wherein the one or more laser light emitting means are chemical laser light emitting means.

In Example 69, the means of unmanned aerial vehicle segment-imagery of any one of claims 60 to 66 is disclosed, wherein the one or more laser light emitting means are dye laser light emitting means.

In Example 70, the means of unmanned aerial vehicle segment-imagery of any one of claims 60 to 66 is disclosed, wherein the one or more laser light emitting means are metal-vapor laser light emitting means.

In Example 71, the means of unmanned aerial vehicle segment-imagery of any one of claims 60 to 66 is disclosed, wherein the one or more laser light emitting means are solid state laser light emitting means.

In Example 72, the means of unmanned aerial vehicle segment-imagery of any one of claims 60 to 66 is disclosed, wherein the one or more laser light emitting means are semiconductor laser light emitting means.

In Example 73, the means of unmanned aerial vehicle segment-imagery of any one of claims 1 to 13 is disclosed, wherein the one or more laser light emitting means are configured to produce a laser light within the visible spectrum.

In Example 74, the means of unmanned aerial vehicle segment-imagery of any one of claims 60 to 73 is disclosed, wherein the one or more laser light emitting means are configured to produce a laser light that is visible between the laser and the laser terminating means.

In Example 75, the means of unmanned aerial vehicle segment-imagery of any one of claims 60 to 74 is disclosed, wherein the laser terminating means is a body of the second unmanned aerial vehicle.

In Example 76, the means of unmanned aerial vehicle segment-imagery of any one of claims 60 to 75 is disclosed, wherein the laser terminating means is a non-reflective surface In Example 77, the means of unmanned aerial vehicle segment-imagery of claim 76 is disclosed, wherein the non-reflective surface is mounted to the second unmanned aerial vehicle;

In Example 78, the means of unmanned aerial vehicle segment-imagery of claim 76 or 77 is disclosed, wherein the non-reflective surface is configured to absorb the laser light.

In Example 79, the means of unmanned aerial vehicle segment-imagery of any one of claims 60 to 78, where the laser targeting means is configured to direct the one or more laser light emitting means in a preprogrammed direction.

In Example 80, the means of unmanned aerial vehicle segment-imagery of any one of claims 60 to 79 is disclosed, wherein the first unmanned aerial vehicle further comprises one or more image sensing means, configured to:

obtain an image of the second unmanned aerial vehicle and provide to the one or more processing means image data corresponding to the obtained image;

and where the one or more processing means are further configured to detect from the image data a position of the second unmanned aerial vehicle; and determine an adjustment instruction based on the image position to cause the one or more laser light emitting means to strike the second unmanned aerial vehicle.

In Example 81, the means of unmanned aerial vehicle segment-imagery of claim 80 is disclosed, wherein the adjustment instruction is an instruction to cause the laser targeting means to modify a laser direction, such that a laser on the first unmanned aerial vehicle terminates on the second aerial vehicle.

In Example 82, the means of unmanned aerial vehicle segment-imagery of any one of claims 60 to 81 is disclosed, wherein the second unmanned aerial vehicle further comprises one or more image sensing means, configured to:

obtain an image of the first unmanned aerial vehicle and provide to the one or more processing means image data corresponding to the obtained image;

and where the one or more processing means are further configured to detect from the image data a position of the first unmanned aerial vehicle; and derive an adjustment instruction based on a relationship between an image position and a target alignment.

In Example 83, the means of unmanned aerial vehicle segment-imagery of claim 82 is disclosed, wherein the adjustment instruction is an instruction to cause the first unmanned aerial vehicle to navigate to an adjusted location, such that a laser on the first unmanned aerial vehicle terminates on the second aerial vehicle.

In Example 84, the means of unmanned aerial vehicle segment-imagery of claim 82 is disclosed, wherein the adjustment instruction is an instruction to cause a laser on the first unmanned aerial vehicle to change alignment such that the laser terminates on the second unmanned aerial vehicle.

In Example 85, the means of unmanned aerial vehicle segment-imagery of claim 82 is disclosed, wherein the adjustment instruction is an instruction to cause the second unmanned aerial vehicle to navigate to an adjusted location, such that a laser on the first unmanned aerial vehicle terminates on the second aerial vehicle.

In Example 86, the means of unmanned aerial vehicle segment-imagery of any one of claims 82 to 85 is disclosed, further comprising a transceiving means, configured to transmit or receive an adjustment instruction.

In Example 87, the means of unmanned aerial vehicle segment-imagery of any one of claims 60 to 86 is disclosed, wherein at least one unmanned aerial vehicle further comprises an ignition means, configured to ignite a fire emitting means, and a fire emitting means storage, configured to store a fire emitting means.

In Example 88, the means of unmanned aerial vehicle segment-imagery of claim 57 is disclosed, wherein the one or more processing means are further configured to control the ignition means to ignite the fire emitting means.

In Example 89, the means of unmanned aerial vehicle segment-imagery of claim 87 or 88 is disclosed, wherein the one or more processing means are further configured to cause the unmanned aerial vehicle to rotate the circular supporting means a combustion period of the fire emitting means.

In Example 90, the means of unmanned aerial vehicle segment-imagery of any one of claims 87 to 89 is disclosed, further comprising a heat sensing means, configured to detect heat above a predetermined threshold.

In Example 91, the means of unmanned aerial vehicle segment-imagery of claim 90 is disclosed, wherein the one or more processing means are further configured to disable one or more motors upon the heat sensing means detecting heat above the predetermined threshold.

In Example 92, the means of unmanned aerial vehicle segment-imagery of any one of claims 60 to 91 is disclosed, wherein the laser targeting means is further configured to aim only horizontally or upward.

In Example 93, the means of unmanned aerial vehicle segment-imagery of any one of claims 60 to 92 is disclosed, wherein the laser targeting means is further configured to avoid aiming the one or more laser light emitting means in a downward direction.

In Example 94, the means of unmanned aerial vehicle segment-imagery of any one of claims 60 to 93 is disclosed, wherein the one or more processing means are programmed with one or more viewer locations comprising person exceeding a viewer density, and wherein the laser targeting means is configured to avoid aiming laser light emitting means toward the one or more viewer locations.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle segment-imagery system comprising a plurality of unmanned aerial vehicles, the plurality of unmanned aerial vehicles further comprising:
   one or more processors, configured to control a predetermined flight plan of the plurality of unmanned aerial vehicles;
   one or more lasers, configured to emit a laser light at a start time;
   one or more image sensors, configured to obtain an image;
   a laser targeting system, configured to
      control the one or more image sensors of a first unmanned aerial vehicle to obtain an image of a second unmanned aerial vehicle;
      provide the one or more processors image data corresponding to the obtained image;
      detect a position of the second unmanned aerial vehicle based on the image data;
      generate a laser direction adjustment based on the detected position of the second unmanned aerial vehicle;
      adjust one or more lasers from the first unmanned aerial vehicle according to the laser direction adjustment; and
      control the laser from the first unmanned aerial vehicle to strike the second unmanned aerial vehicle.

2. The unmanned aerial vehicle segment-imagery system of claim 1, further comprising a ring around a circumference of the first unmanned aerial vehicle, wherein at least one of the one or more lasers is mounted to the ring.

3. The unmanned aerial vehicle segment-imagery system of claim 1, further comprising a laser support structure around a body of the first unmanned aerial vehicle, wherein at least one of the one or more lasers is mounted to the laser support structure.

4. The unmanned aerial vehicle segment-imagery system of claim 3, wherein the one or more lasers are adjustably mounted to the laser support structure.

5. The unmanned aerial vehicle segment-imagery system of claim 1, further comprising a laser support structure around one or more propeller motors of the first unmanned aerial vehicle, wherein at least one of the one or more lasers is mounted to the laser support structure.

6. The unmanned aerial vehicle segment-imagery system of claim 1, wherein the one or more lasers are configured to produce a laser light that is visible between the laser and a laser terminator.

7. The unmanned aerial vehicle segment-imagery system of claim 1, further comprising a transceiver, configured to transmit or receive the adjustment instruction.

8. A method of unmanned aerial vehicle segment-imagery comprising:
   controlling, via one or more processors, a predetermined flight plan of a plurality of unmanned aerial vehicles;
   controlling, via one or more processors, a first unmanned aerial vehicle to obtain an image of a second unmanned aerial vehicle;
   providing, via one or more image sensors, image data corresponding to the obtained image;
   detecting, via one or more processors, a position of the second unmanned aerial vehicle based on the image data;
   generating, via one or more processors, a laser direction adjustment based on the position of the second unmanned aerial vehicle;
   adjusting, via one or more processors, one or more lasers according to the laser direction adjustment; and emitting a laser light, via the one or more lasers, at a start time to strike the second unmanned aerial vehicle.

9. The method of unmanned aerial vehicle segment-imagery of claim 8, wherein at least one of the one or more lasers is mounted to a ring surrounding the first unmanned aerial vehicle.

10. The method of unmanned aerial vehicle segment-imagery of claim 8, wherein at least one of the one or more lasers is mounted to a laser support structure around a body of the first unmanned aerial vehicle.

11. The method of unmanned aerial vehicle segment-imagery of claim 8, wherein the laser light is visible between the laser and a laser terminator.

12. The method of unmanned aerial vehicle segment-imagery of claim 8, wherein the laser light terminates in a body of the second unmanned aerial vehicle.

13. The method of unmanned aerial vehicle segment-imagery of claim 8, wherein the laser light terminates in a laser terminator on the second unmanned aerial vehicle.

14. A means of unmanned aerial vehicle segment-imagery comprising a plurality of unmanned aerial vehicles further comprising:
one or more processing means, configured to control a predetermined flight plan of the plurality of unmanned aerial vehicles;
one or more laser light emitting means, configured to emit a laser light at a start time;
one or more image sensing means, configured to obtain an image; and
and a laser targeting means, configured to
control the one or more image sensors of a first unmanned aerial vehicle to obtain an image of a second unmanned aerial vehicle;
provide the one or more processors image data corresponding to the obtained image;
detect a position of the second unmanned aerial vehicle based on the image data;
generate a laser direction adjustment based on the detected position of the second unmanned aerial vehicle;
adjust one or more lasers from the first unmanned aerial vehicle according to the laser direction adjustment; and
control the laser from the first unmanned aerial vehicle to strike the second unmanned aerial vehicle.

15. The means of unmanned aerial vehicle segment-imagery of claim 14, further comprising a circular supporting means around a circumference of the first unmanned aerial vehicle,
wherein at least one of the one or more laser light emitting means is mounted to the circular supporting means.

* * * * *